(12) United States Patent
Andre et al.

(10) Patent No.: US 6,612,622 B2
(45) Date of Patent: Sep. 2, 2003

(54) ROTATABLE QUICK CONNECTOR

(75) Inventors: Michael J. Andre, Lincoln Park, MI (US); George Szabo, Ortonville, MI (US)

(73) Assignee: ITT Manufacturing Enterprises, Inc., Wilmington, DE (US)

(*) Notice: Subject to any disclaimer, the term of this patent is extended or adjusted under 35 U.S.C. 154(b) by 0 days.

(21) Appl. No.: 09/748,959

(22) Filed: Dec. 27, 2000

(65) Prior Publication Data

US 2001/0048225 A1 Dec. 6, 2001

Related U.S. Application Data (60) Provisional application No. 60/194,938, filed on Apr. 6, 2000.

(51) Int. Cl.[7] ............................................. F16L 37/12
(52) U.S. Cl. ....................... 285/305; 285/308; 285/319; 285/423; 285/921
(58) Field of Search ................... 285/305, 319, 285/308, 423, 921, 334.1, 334.3

(56) References Cited

U.S. PATENT DOCUMENTS

| | | | | |
|---|---|---|---|---|
| 3,929,357 A | * | 12/1975 | DeVincent et al. | ......... 285/319 |
| 4,423,892 A | | 1/1984 | Bartholomew | |
| 4,664,427 A | | 5/1987 | Johnston | |
| 5,165,733 A | * | 11/1992 | Sampson | ..................... 285/253 |
| 5,275,443 A | | 1/1994 | Klinger | ....................... 285/82 |
| 5,395,140 A | * | 3/1995 | Wiethorn | ....................... 285/93 |
| 5,423,577 A | * | 6/1995 | Ketcham | ..................... 285/305 |
| 5,542,716 A | | 8/1996 | Szabo et al. | |
| 5,683,117 A | * | 11/1997 | Corbett et al. | ................. 285/24 |
| 5,730,481 A | | 3/1998 | Szabo et al. | |
| 5,782,502 A | | 7/1998 | Lewis | |
| 5,853,202 A | * | 12/1998 | Li et al. | ..................... 285/256 |
| 5,863,077 A | | 1/1999 | Szabo et al. | |
| 5,882,048 A | | 3/1999 | Kawasaki et al. | |
| 5,897,145 A | * | 4/1999 | Kondo et al. | ................. 285/93 |
| 5,924,746 A | | 7/1999 | Fixemer | |
| 5,951,063 A | | 9/1999 | Szabo | |
| 6,155,612 A | | 12/2000 | Szabo | |
| 6,173,998 B1 | | 1/2001 | Bock | |
| 6,318,764 B1 | * | 11/2001 | Trede et al. | ................. 285/305 |

FOREIGN PATENT DOCUMENTS

| | | |
|---|---|---|
| DE | 197 22 842 A1 | 12/1998 |
| EP | WO9854503 | * 12/1998 |
| GB | 2 077 377 | 12/1981 |
| GB | 2 165 604 | 4/1986 |
| GB | 2328260 | * 2/1999 |

* cited by examiner

Primary Examiner—Lynne H. Browne
Assistant Examiner—G M Collins
(74) Attorney, Agent, or Firm—Young & Basile, P.C.

(57) ABSTRACT

A quick connector includes a housing assembly for receiving one end of a conduit with an enlarged annular flange and a retainer for locking the conduit in the housing assembly. The housing assembly includes first and second housings which are rotatably and non-axially displaceably interconnected. A rigid top hat is fixedly mounted in the bore in the first housing to prevent axial displacement of the first and second housings. An annular recess in the top hat receives the flange on the conduit. The housings can also be incrementally indexable ribs on a stem of one housing fixedly and non-rotatingly engage an inner surface of a flexible conduit.

24 Claims, 7 Drawing Sheets

ROTATABLE QUICK CONNECTOR

CROSS REFERENCE TO CO-PENDING APPLICATION

This application claims the benefit of the filing date of co-pending, U.S. Provisional Patent Application, Serial No. 60/194,938, filed Apr. 6, 2000, the contents of which are incorporated herein in its entirety.

BACKGROUND

The present invention relates, in general, to fluid quick connector assemblies which couple male and female connector components and, more specifically, to fluid quick connectors having a retainer which locks the male connector component in the female connector component.

Snap-fit or quick connectors are employed in a wide range of applications, particularly, for joining fluid carrying conduits in automotive and industrial application. In a typical quick connector with an axially displaceable retainer, the retainer is fixedly mounted within a bore in a housing of a female connector component or element. The retainer has a plurality of radially and angularly extending legs which extend inwardly toward the axial center line of the bore in the housing. A tube or male fitting to be sealingly mounted in the bore in the female component includes a radially upset portion or flange which abuts an inner peripheral surface of the retainer legs. Seal and spacer members as well as a bearing or top hat are typically mounted in the bore ahead of the retainer to form a seal between the housing and the male fitting when the male fitting is lockingly engaged with the retainer legs.

Radially displaceable retainers in which the retainer is radially displaceable through aligned bores or apertures formed transversely to the main through bore in the female component or housing are also known. The radially displaceable retainer is typically provided with a pair of depending legs which are sized and positioned to slip behind the radially upset portion or flange on the male conduit only when the male connector or conduit is fully seated in the bore in the female connector. This ensures a positive locking engagement of the conduit with the female connector as well as providing an indication that the conduit is fully seated since the radially displaceable retainer can be fully inserted into the female connector only when the conduit has been fully inserted into the bore in the female connector.

Regardless of the type of retainer, the female housing or component portion of a fluid connector typically includes an elongated stem having one or more annular barbs spaced from a first end. The barbs provide secure engagement with a hose or conduit which is forced over the barbs to connect the female housing with one end of the conduit.

Due to the secure engagement between the conduit and the female component, the open end of the axial through bore in the female connector portion of a fluid connector designed with an axially displaceable retainer or the transverse bores in a female connector designed to receive a radially displaceable retainer are fixed in one circumferential position depending upon the position of the tubing and the female connector when the tubing and female connector are joined together. In certain applications, this could limit accessibility to and make it difficult to insert the retainer into the female component, particularly in the case of a radial retainer. Interference with surrounding components frequently makes access to the quick connector for both locking or unlocking operations difficult, if not impossible.

Thus, it would be desirable to provide a fluid quick connector which overcomes the problems of previously devised quick connectors with respect to ease of insertion of the retainer into the quick connector while still providing all of the required attributes of a fluid quick connecter in terms of sealing and locking engagement between the conduits and the quick connector. It would also be desirable to provide such a fluid quick connector which achieves the aforementioned advantages without requiring significant modification to existing, proven quick connector designs. It would also be desirable to provide a fluid quick connector which is easily rotatable over 360° to facilitate insertion or removal of the retainer into or out of the quick connector.

SUMMARY OF THE INVENTION

The present invention is a quick connector for joining first and second conduits in fluid flow communication in which the retainer receiving portion of the quick connector can be rotated or swivelled over a complete 360° range to facilitate easy access to the retainer or the retainer receiving portion of the quick connector for insertion into or removal of the retainer from the quick connector housing.

In one aspect of the invention, the present quick connector includes a first housing having a through bore with a first bore portion adapted for receiving a first end of a first conduit. Seal elements are mounted in the first bore portion for sealing the first housing to the first end of the first conduit. A second housing is rotatably and non-axially displaceably connected to the first housing. The second housing has a through bore for receiving the first conduit therethrough. A retainer is mountable in the second housing for lockingly coupling the first conduit to the first housing.

In a specific aspect of the invention, the first housing includes an enlarged end flange which is rotatably positioned adjacent an annular shoulder or flange at one end of the second housing, with a major extent of the first housing projecting through the aperture in the one end of the second housing. In one version, the first housing is inserted through the first end of the second housing until the flange engages the shoulder. In another version, the enlarged flange and the end of the first housing are provided with a plurality of slots which allow portions of the end flange and the adjacent portion of the first housing to flex radially inward for insertion through the open second end of the second housing until the enlarged flange snaps radially outward to its nominal diameter after passing the annular shoulder at the end of the second housing.

The first and second housings are held in a rotatable position by means of a rigid member or top hat which is disposed in the bore in the first housing. In one aspect, the top hat includes one or more axially projecting legs having hooks or projections at a distal end which engage apertures formed in the end of the second housing to fixedly latch the top hat to the second housing and rotatably trapping the enlarged flange on the first housing between a flange on the top hat and the shoulder in the second housing. In another aspect, an enlarged flange on the top hat is press fit in locked relationship to the second housing.

In another aspect of the invention, the rigid member or top hat has an annular recess extending from one end which is sized to receive the enlarged flange on the first conduit therein. This places the first conduit flange axially ahead of the transverse bore through the second housing thereby enabling the retainer to be formed with generally flat end surfaces which engage the flange on the first conduit to prevent axial separation of the first conduit from the first housing.

In another aspect of the invention, a web is formed in one of the large apertures forming the transverse bore in the housing and divides the large aperture into two smaller apertures each receiving an end portion of one of the side legs of the retainer. The web limits radially inward flexing of the end portion of the side legs of the retainer during removal of the retainer to prevent damage to the retainer caused by excessive flexing. At the same time, the web does not interfere with the normal insertion and operation of the retainer.

In another aspect of the invention, usable with the present dual housing assembly or a single housing, the tip end of one housing is formed with a plurality of radially outward extending projections or ribs which forcibly engage the inner surface of the flexible conduit mounted thereover. The projections prevent rotation between the flexible conduit and the housing which could lead to the formation of leakage paths between the flexible conduit and the housing and/or separation of the flexible conduit from the housing.

In another aspect, a cap is mounted on the tip end of the housing to facilitate a smooth connection of the tip end of the housing and the flexible conduit. The cap includes a cooperating projection and recess formed within the interior of the bore of the cap and on the tip end of the housing to snap mount the cap on the housing.

The rotatable quick connector of the present invention overcomes a disadvantage frequently encountered with previously designed quick connectors incorporating a releasably mountable retainer wherein the use position of the quick connector may be adjacent to another component to hereby limiting access for insertion or removal of the retainer in the housing. The quick connector of the present invention uniquely provides a rotatable quick connector housing assembly which enables the retainer receiving housing of the quick connector to be rotated over a full 360° range to facilitate easy access to the retainer mounted in the rotatable housing. However, at the same time, the quick connector with rotatable features maintains all of the functions and advantages of a standard quick connector in terms of easy insertion of a conduit therein and high pullout forces locking the conduit in the quick connector.

The quick connector of the present invention also provides other advantages over previously devised quick connectors. The top hat mounted in the housing assembly is also usable in a conventional quick connector with a single housing and includes an annular recess at one end for receiving the enlarged flange on the conduit. This enables the retainer to be simply formed with generally flat ends on the side legs for insertion through the transverse bore in the female component housing and engagement with the enlarged flange on the conduit.

BRIEF DESCRIPTION OF THE DRAWING

The various features, advantages and other uses of the present invention will become more apparent by referring to the following detailed discussion and drawing in which.

DETAILED DESCRIPTION

Figure 1:
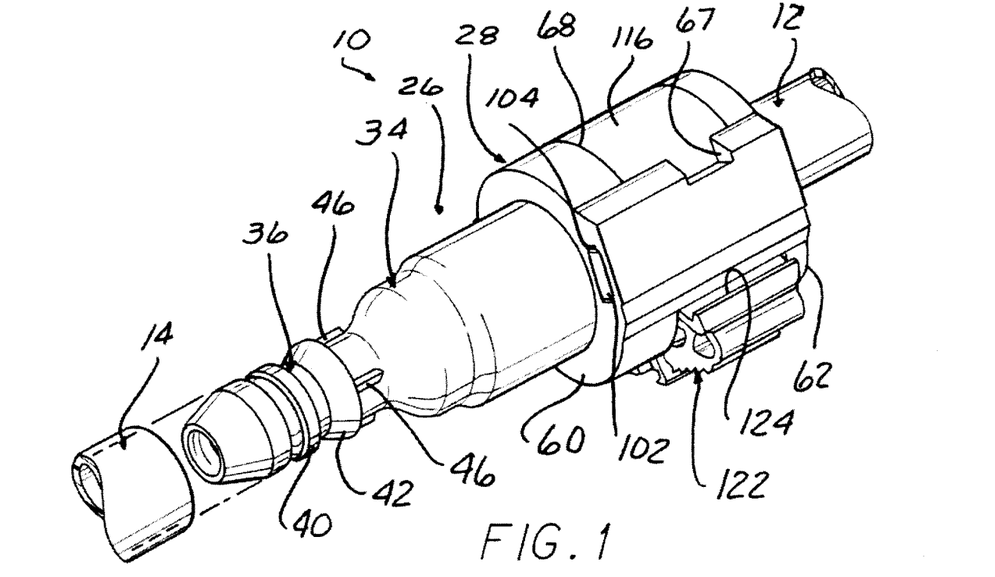
FIG. 1 is a perspective view of an assembled rotatable quick connector according to one aspect of the present invention.
Figure 2:
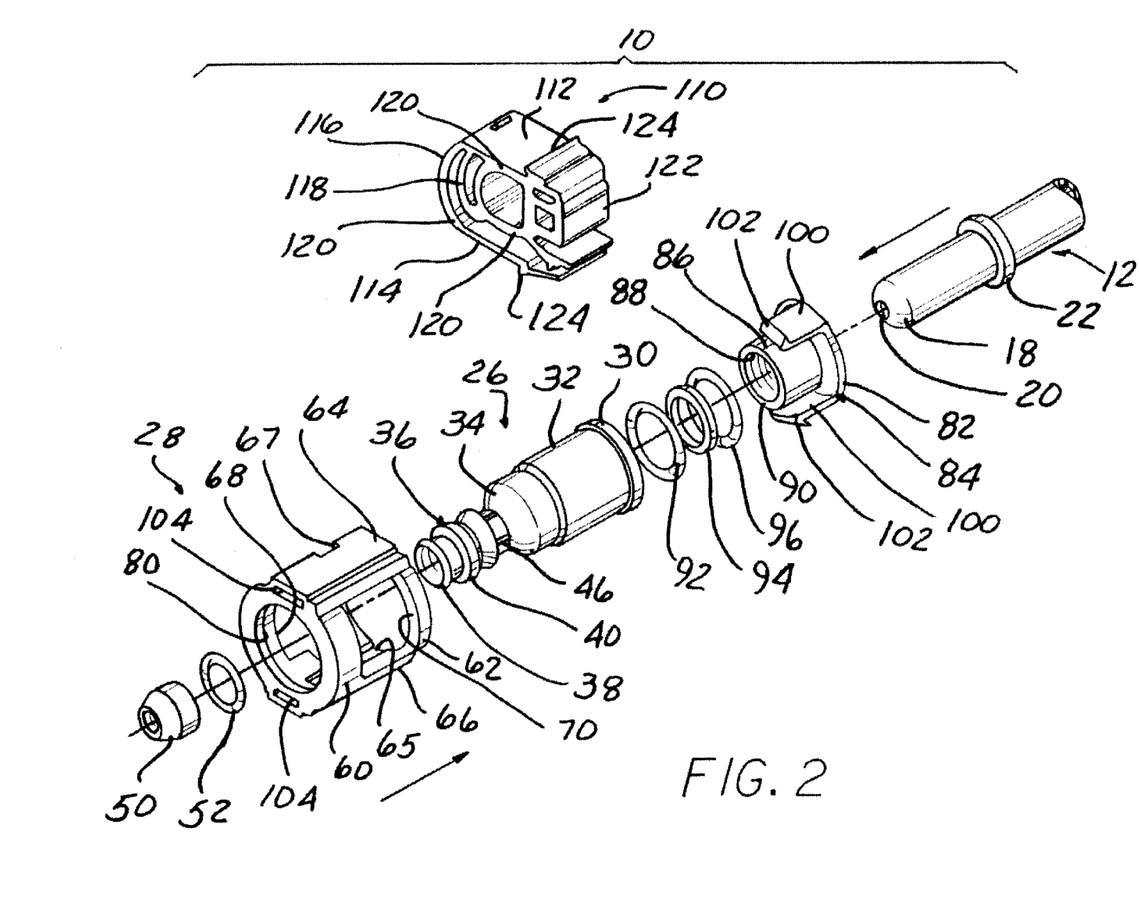
FIG. 2 is an exploded, perspective view of the rotatable quick connector shown in FIG. 1.
Figure 3:
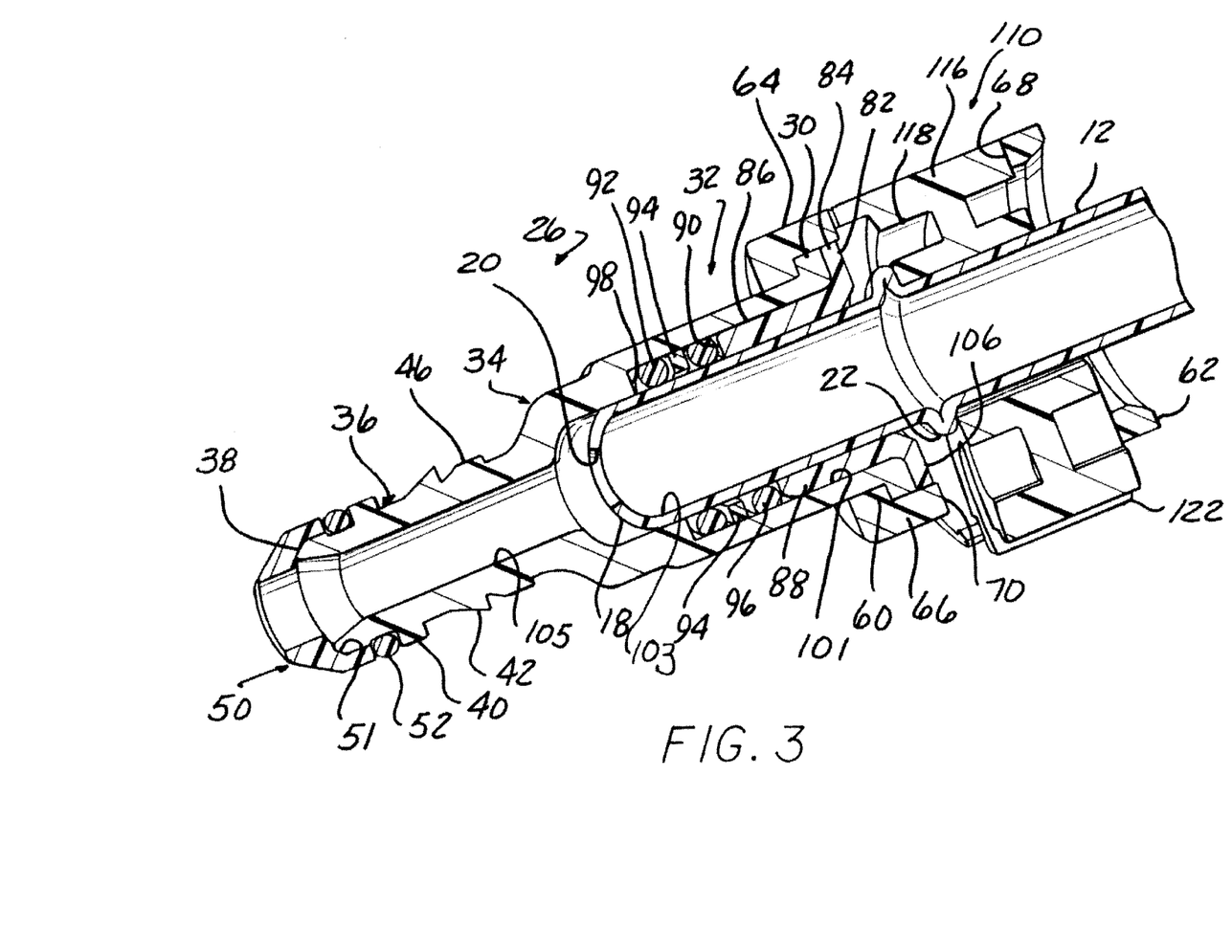
FIG. 3 is a longitudinal, cross-sectional, perspective view of the assembled rotatable quick connector shown in FIG. 1.

Referring now to FIGS. 1–3, there is depicted one aspect of a quick connector 10 constructed in accordance with the teachings of the present invention. As is conventional, the quick connector 10 is adapted for sealingly and lockingly, yet removably interconnecting first and second conduits 12 and 14 in a fluid tight, leak proof, sealed connection by a snap-together connection.

The first conduit 12 is typically formed of metal and has an endform with a tapered end or tip 18 at one end, a through bore 20 and an enlarged annular flange 22 spaced from the tip end 18.

The second conduit 14 is typically formed of a flexible material, such as a plastic, i.e., nylon. The conduit 14 has an internal bore which communicates with a bore extending through the quick connector 10, as described hereafter, and the bore 20 in the first conduit 12.

The quick connector 10 includes a first housing 26 and a second housing 28 which are adapted to be axially connected to provide an axially extending throughbore between opposite ends.

The first housing 26 is formed of a one piece body, preferably of a high strength plastic, and has a stepped exterior surface formed of a raised annular flange 30 at one end, an enlarged diameter portion 32 extending from the flange 30, an intermediate, smaller diameter portion 34 and a necked-down portion or stem 36 which extends from the intermediate diameter portion 34 to an annular flange 38 formed at another end of the first housing 26. At least one and, preferably, a plurality of longitudinally spaced barbs or projections 40 and 42 are formed along the exterior of the stem 36 for secure engagement with the second conduit 14, which is slidably urged thereover.

According to one aspect of the present invention, a plurality of radially extending ribs 46, with four being used as an example only, are formed on the stem 36 between the barb 42 and the intermediate diameter portion 34 of the first housing 26. When the first conduit 14 shrinks back to its nominal diameter, at least one an end portion disposed between the barb 42 and the intermediate diameter portion 34 of the first housing 26, the ribs 46 will engage the interior surface of the second conduit 14 and assist in preventing relative rotation between the first housing 26 and the second conduit 14.

An endform interface member 50 in the form of a cap having a conical end portion which smoothly merges with an annular end portion is slidably mounted over the end of the stem 36 of the first housing 26. A seal member 52, typically in the form of an O-ring is interposed between the annular end portion of the cap 50 and the barb 40. The structure and operation of the interface endform or cap 50 are described in greater detail in U.S. patent application Ser. No. 09/309,979, which is assigned to the assignee of the present invention. The entire contents of this copending application are incorporated herein by reference.

According to a unique aspect of the present invention, the cap 50 is provided with an interior annular recess 51 spaced a distance from the end face of the annular end portion of the cap 50. The recess 51 is sized to engage the annular flange 38 on the end of the nose portion 36 of the first housing 26 to aid in maintaining the cap 50 on the first housing 26. The use of this snap-on feature for the cap 50 is preferably employed with first housings 26 formed of plastic.

The second housing 28 is preferably formed of a one piece, unitary body of a high strength plastic, such as nylon, for example. The second housing 28 includes first and second annular ring members 60 and 62, respectively. The first and second ring members 60 and 62 are spaced apart and interconnected by a pair of side legs 64 and 66 which extend between peripheral edges of the first and second ring members 60 and 62. Notches 67 are formed along one edge of each of the side legs 64 and 66 for receiving an interconnecting projection in a retainer, as described hereafter. Preferably, the side legs 64 and 66 are parallel to each other and, in conjunction with the first and second ring members 60 and 62, define transversely opening apertures 68 and 70. The transversely extending apertures 68 and 70 communicate with a through bore which extends longitudinally through the second housing 28 from a first bore within the first ring member 60 to a second bore in the second ring member 62.

Figure 10:
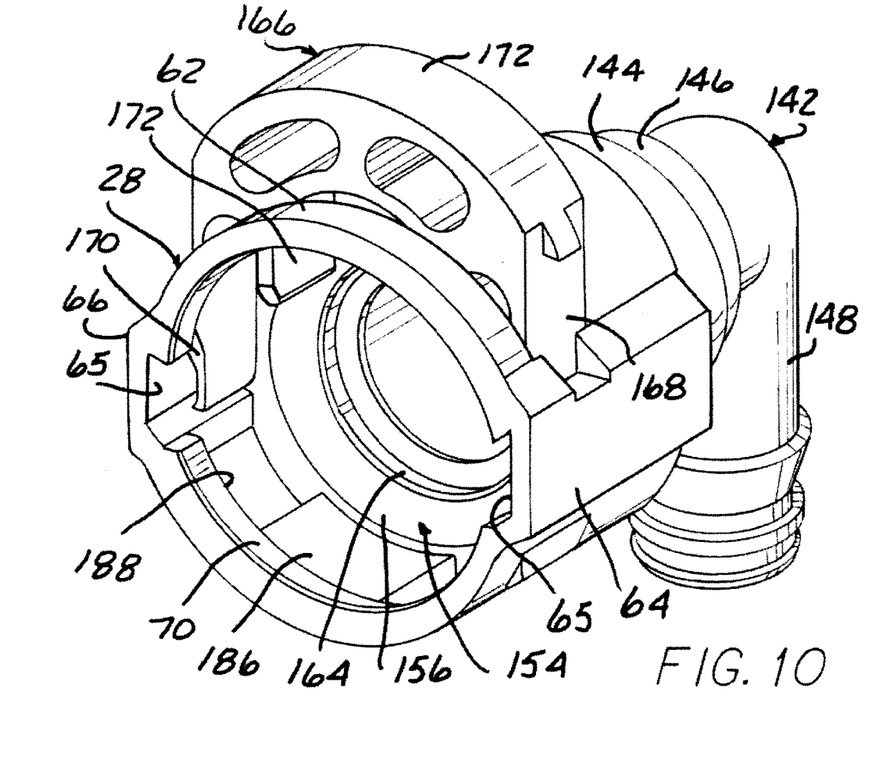
FIG. 10 is a perspective view of the rotatable quick connector of FIG. 7 shown in a shipping state.

Internal grooves 65 are formed along an inner surface of each side leg 64 and 66. The grooves 65 continue through the ring members 60 and 62 as seen in FIG. 10.

According to a unique feature of the present invention, the first and second housings 26 and 28 are swivelably or rotatably connected. The rotatable connection of the first and second housings 26 and 28 is provided by the interaction of an annular recess 80 formed interiorly of the first ring member 60 in the second housing 28, the enlarged end flange 30 on the first housing 26 and an annular flange 82 on a top hat 84.

The top hat 84 is in the form of a one-piece member typically of a rigid plastic having an annular sleeve 86 projecting from the flange 82. A through bore 88 extends through the sleeve 86 and the flange 82 for accommodating the end portion of the first conduit 12 and for allowing the tip end 18 of the first conduit 12 to slide therethrough as shown in FIG. 3.

Referring briefly to FIG. 3, an end face 90 of the sleeve 86 on the top hat 84 holds a plurality of seal and spacer elements including one O-ring 92, an annular spacer 94 and another O-ring 96 in position adjacent a shoulder 98 formed between a first enlarged diameter bore portion and a second, smaller diameter bore portion 103 which form part of a stepped bore extending through the first housing 26. The stepped bore also includes a third yet smaller diameter bore 105 which extends through the stem 36 to the annular flange 38 at one end of the first housing 26.

As also shown in FIG. 3, the seal and spacer elements 92, 96 and 94 sealingly engage the outer surface of the first conduit 12 when the tip end 18 of the first conduit 12 is inserted through the top hat 84 and into the stepped bore in the first housing 26. The bore 88 formed through the sleeve 86 of the top hat 84 acts as a bearing surface for the end portion of the first conduit 12.

In one aspect of the present invention, the top hat 84 is lockingly held in position in the first housing 26 by means of a pair of legs 100, each of which terminates in an end projection or hook 102. The hooks 102 on each leg 100 slide through aperture 104 formed in the wall portion of the first ring 60 in the second housing 28, as shown in FIGS. 1 and 2. The legs 100 on the top hat 84 are slidable through the longitudinally extending grooves 65 in the side legs 64 and 66 of the second housing 28 to align the hook 102 at the end of each leg 100 with one of the apertures 104 in the ring member 60 of the second housing 28. The hooks 102 snap around the end surface of the ring member 60 on the second housing 28 to lock the top hat 84 in the position shown in FIG. 3.

In this position, the top hat 84 is disposed adjacent to, but spaced by a small clearance from the annular flange 30 on the first housing 26. As shown in FIGS. 2 and 3, the annular flange 30 on the first housing 26 is disposed in the annular recess 80 in the ring member 60 of the second housing 28. This enables the first and housing 26 and the second housing 28 to rotate relative to each other. As such, the second housing 28 may be rotated over a range of 360° about both of the first conduit 12 and the second housing 28 which has the second conduit 14 mounted thereto, for insertion or removal of a retainer 110 from the transverse apertures 68 and 70 in the second housing 28.

The retainer 110 is but one of a number of different shaped retainers, such as those shown in U.S. Pat. Nos. 5,542,716; 5,730,481; 5,782,502; 5,863,077; and 5,951,063, which can be used in the quick connector 10. The retainer 110 is adapted to be received in the transverse apertures 68 and 70 in the second housing 28 such that legs 112 and 114 of the retainer 110 will pass along either side of an exposed end portion of the first conduit 12 as the retainer 110 is inserted leg-first into the second housing 28. As illustrated in FIG. 2, the legs 112 and 114 of the retainer 110 extend in a first direction from opposite sides of an intermediate bridging portion or bight 116.

Each leg 112 and 114 includes an inner edge 118 which defines a "locking" surface adapted to axially oppose and preferably, axially engage one side of the upset bead or flange 22 of the first conduit 12 when the retainer 110 is fully inserted in the second housing 28. In this manner, the locking surface 118 on each retainer leg 112 and 114 serves to prevent axial displacement of the upset bead 22 from the axial bore of the second housing 28.

A cantilevered portion 120 on each leg 112 and 114 defines a radially-disposed, resiliently-yieldable surface which faces the other leg 114 or 112. These opposed radial surfaces 120 interferingly engage the exposed longitudinal end portion of the first conduit 12 upon full insertion of the retainer 110 into the second housing 28, thereby locking the retainer 110 to the first conduit 12.

A pair of outwardly extending projections or edges 124 are formed on the bottom portion of each leg 112 and 114. The projections 124 are devised to extend through the transverse aperture 70 and snap around the exterior surface of the ring member 60 and 62 of the second housing 28 to lock the retainer 110 in a fully inserted position in the second housing 28 as shown in FIG. 1. The projections 124 also engage the grooves 65 on the inside surface of the side legs 64 and 66 of the second housing 28 to temporarily lock the retainer 110 in a partially inserted, shipping position as shown in FIG. 10.

In assembling the connector 10, the first housing 26 is slidably inserted in a first direction through the bore 70 in the ring member 62 of the second housing 28 and through the bore 68 in ring member 60 until one edge of the flange 30 at the one of the first housing 26 engages a shoulder formed by the recess 80 in the ring member 60. The O-rings 92 and 96 and spacer 94 then inserted into the first bore 101 in the enlarged portion 32 of the first housing 26. The sleeve 86 of the top hat 84 is then inserted through the first bore portion 101 in the first housing 26 until the flange 82 is disposed adjacent to the flange 30 on the first housing 26. At this time, the hooks 102 on the legs 100 of the top hat 84 will have slid through the bores 104 and snapped around the end face of the ring member 60 locking the top hat 84 to the second housing 28.

The first conduit 12 can then be inserted through the bore 88 in the top hat 84, past the O-rings 92 and 96 and the spacer 94 and into the second bore portion 103 in the first housing 26 as shown in FIG. 3. The first conduit 12 is inserted into the first housing 26 until the annular flange 22 is disposed adjacent to the top hat 84 indicating a fully inserted position of the first conduit 12 in the first housing 26.

The retainer 110 is then pushed from the shipping position into the transverse apertures 68 and 70 in the second housing 28 to lock the first conduit 12 in the first housing 26; while still allowing independent rotation of the first and second housings 26 and 28 relative to each other.

Returning to FIG. 2, by example, one of the legs 112 of the retainer 116 extends to define a locking flap 122 at its free end. The locking flap 122 is preferably separated from the rest of the leg 112 by a living hinge or similar bridging member of reduced thickness. In this manner, the locking flap 122 is advantageously integrally formed with the retainer 110. It will be appreciated, however, that the use of separately formed, e.g., separated molded, flap member which is thereafter hingedly interconnected with one of the legs 112 or 114 either through use of integrally-formed hinge or a separate joining element, is also possible.

The locking flap 122 is permitted to pivot at the living hinge into interlocking engagement with the free end of the other leg 114, this being accomplished in the retainer 110 by means of interlocking engagement of a ramped locking projection on the inside of leg 114 with a complementary slot formed in the locking flap 122 adjacent the free end of the leg 112.

When the locking flap 122 is pivoted about axis into interlocking engagement with the other leg 114, as well as with its own leg 112 as described above, a surface on the locking flap 122 is brought into axial opposition with and, preferably, axially engages the upset bead 22 of the first conduit seated within the axial bore of the second housing 28. The locking flap 122 thus axially engages the upset bead 22 along a circumferential side edge thereof diametrically opposite to the circumferential side edge portion axially engaged by locking surface 118 on the bight 116. When added to the circumferential portions of the upset bead 22 axially engaged by the locking surface 118 on each leg 112 and 114, it will be appreciated that the quick connector 10 provides for substantially symmetrical axial engagement of the upset bead 22 while eliminating creation of deleterious bending moments which might cause leaking or structural failure of the resulting connection.

Further details concerning the construction of the retainer 110 can be had by referring to U.S. Pat. No. 5,782,502, the entire contents of which are incorporated herein by reference.

It will also be understood that the first and second housings 26 and 28 of the connector 10 of the present invention may be used with other types of radially displaceable retainers shown in U.S. Pat. Nos. 5,542,716 and 5,951,063.

Further, the rotatable connection between two portions of a quick connector can also be applied to quick connectors having axially displaceable retainers as shown in U.S. Pat. Nos. 5,542,712 and 5,456,600. In addition, the features of the present invention may also be applied so-called "squeeze-to-release" connectors shown by way of example in U.S. Pat. Nos. 5,873,610 and 5,568,946.

Figure 4:
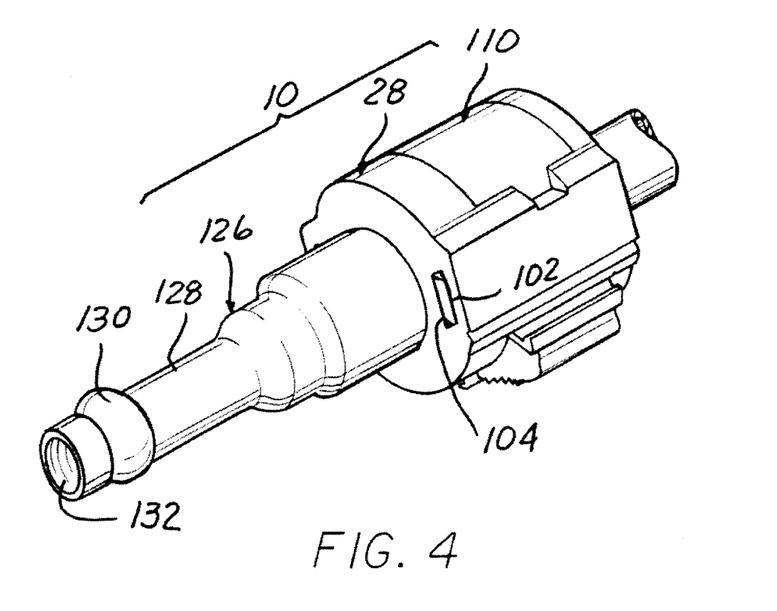
FIG. 4 is a perspective view of an assembled rotatable quick connector according to another aspect of the present invention.
Figure 5:
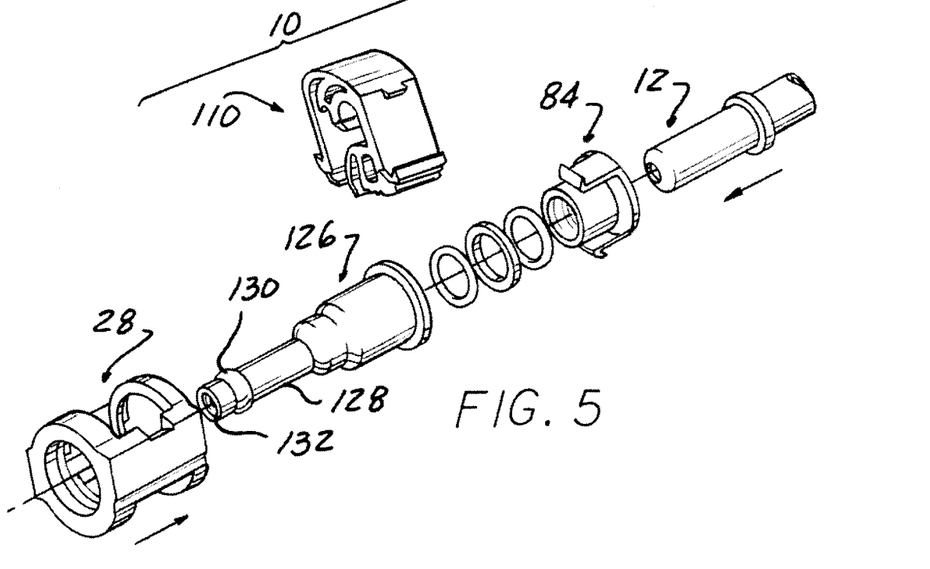
FIG. 5 is a exploded, perspective view of the rotatable quick connector shown in FIG. 4.
Figure 6:
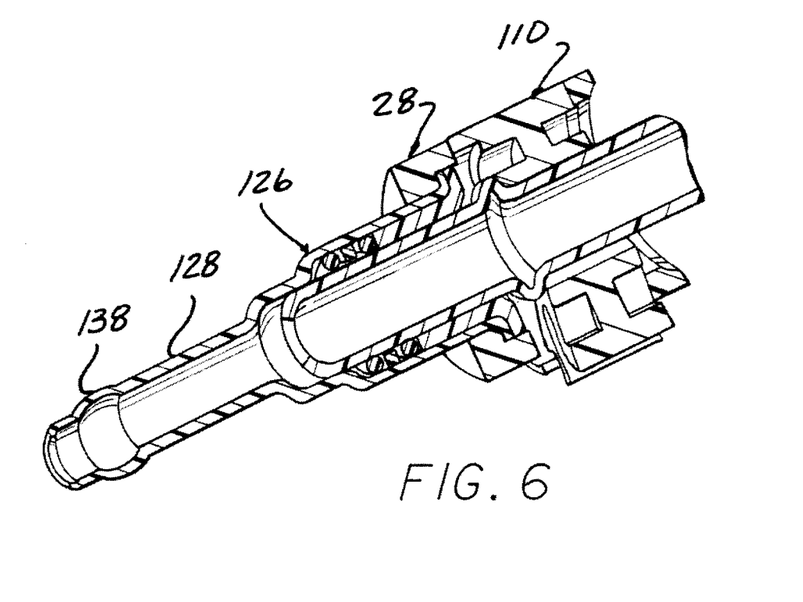
FIG. 6 is a longitudinal, cross-sectional, perspective view of the rotatable quick connector shown in FIG. 4.

Referring now to FIGS. 4, 5, and 6, there is depicted a quick connector 10 similar to quick connector 10 which has a first housing 126 with a modified stem or end portion 128. The first housing 126 lends itself to formation from a metal material, such as stainless steel, etc. The stem 128 includes a generally rounded enlargement 130 spaced from a first end 132 which is adapted to engage one end of the second conduit 14, not shown. A cap, similar to cap 50, and including an O-ring 52, but without an annular interior recess 51, may also be employed with the first housing 126.

Otherwise, the construction, assembly and operation of the quick connector 10 shown in FIGS. 4–6 is identical to that described above and includes the second housing 28, and the top hat 84 which is adapted to receive the first conduit 12.

Referring now to FIGS. 7–10, there is depicted another aspect of a quick connector constructed according to the teachings of the present invention. The quick connector 140 shown in FIGS. 7–10 shares some of the same elements as the quick connector 10 described above and shown in FIGS. 1–6; but with several modifications which will be described in detail. Like elements of the quick connector 140 which are identical to like elements in the quick connector 10 will be described only briefly hereafter, reference being had to the prior description of such elements.

According to this aspect of the present invention, a first housing 142 has a stepped bore extending therethrough from an enlarged diameter bore portion in an enlarged end portion of the first housing 142, through a second smaller diameter bore portion in an intermediate portion 146 of the first housing 142 to a third yet smaller diameter end portion extending through a third portion 148 of the second housing 142. Although the first housing 142 is illustrated as being in the form of a 90° elbow, it will be understood that the first housing 142 may take any other shape, such as a conventional, axial in-line housing, similar to that shown above for the first housing 26, as well as a 45° elbow, etc. The first bore portion in the first end portion 144 of the first housing 142 receives the O-ring 92, the spacer 94 and the O-ring 96 described above.

The first housing 142 also includes an enlarge diameter end flange 150. At least one and preferably a plurality of circumferentially spaced slots 152 are formed in the first housing 142 through the flange 150 and partially along the length of the first end portion 144. The slots 152 allow radial movement of the flange 150 and the first end portion 144 of the first housing 142 as the first end portion 144 of the first housing 142 is slidably inserted into the second housing 28. Thus, the quick connector 140 of this aspect of the invention differs from the prior connector 10 in that it relies on a slide-in insertion of the first housing 142 into the second housing 28, opposite from the insertion direction of the first conduit 12 into the first housing 26 and a snap-in connection between the first and second housings 142 and 28 rather than a slide-in connection as for the connector 10.

During the connection of the first housing 142 and the second housing 28, the peripheral edge of the flange 150 will first engage the end portion of the bore in the ring member 60 of the second housing 28. This causes a radially inward compression of the flange 150 and the first end portion 144 of the first housing 142 until the flange 150 enters the recess 106 formed in the ring member 60. The flange 150 then snaps radially outward locking the first housing 142 in the second housing 28 and preventing radial disengagement in a direction opposite from the insertion direction.

It should be noted that the O-rings 92 and 96 and the spacer 94 can be preassembled in the first housing 142 prior to insertion of the first housing 142 into the second housing 28. It should also be seen that flange 150 is able to be rotated 360° within the recess 106 in the second housing 28.

A top hat 154 includes an enlarged end flange 156 and a smaller diameter annular sleeve 158 projecting therefrom. The outer diameter of the sleeve 158 is sized to slide within the first bore portion of the first end portion 144 of the first housing 142 into engagement with the O-ring 96 thereby holding the O-rings 92 and 96 and the spacer 94 in position within the first bore portion of the first housing 142 as shown in FIG. 9.

In this position, a shoulder 160 formed on the top hat 154 between the flange 156 and the sleeve 158 is disposed adjacent the edge surface of the flange 150 on the first housing 142, by a small clearance therebetween and rotatably traps the flange 150 between the shoulder 160 and the inner edge of the ring member 60 adjacent to the recess 106. The flange 156 of the top hat 154 is dimensioned to have an interference fit with the bore 106 formed in the ring member 60 of the second housing 28 as shown in FIG. 9. The interference fit can be provided by a suitably sized outer diameter of the flange 156 or by means of radially outward projecting, deformable, ribs 162 disposed circumferentially about the peripheral side edge of the flange 156. The ribs 162 engage the inner surface of the ring member 60 in the second housing 28 and deform to press fit the top hat 154 in a position in the second housing 28 spaced by a small clearance from the flange 150 of the first housing 142. Thus, the first housing 142 is trapped within the second housing 28 by the interaction of the top hat 154 and the recess 106 in the second housing 28; yet is able to rotate though 360°. This allows the transverse apertures 68 and 70 in the second housing 28 to be rotated to any position to allow easy access for insertion of or removal of the retainer 166 therefrom.

The features of the retainer 166 and the top hat 154 described above and shown in FIG. 8 can also be applied to the quick connector 10 shown in FIGS. 1–6 in order to seat the flange 22 on the first conduit 12 in the top hat 154.

Figure 7:
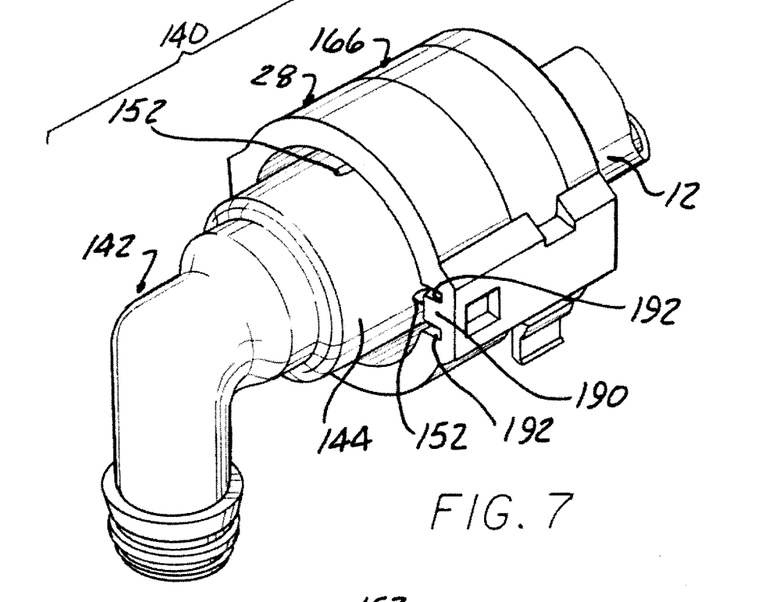
FIG. 7 is a perspective view of a rotatable quick connector according to another aspect of the present invention shown in an assembled state.
Figure 9:
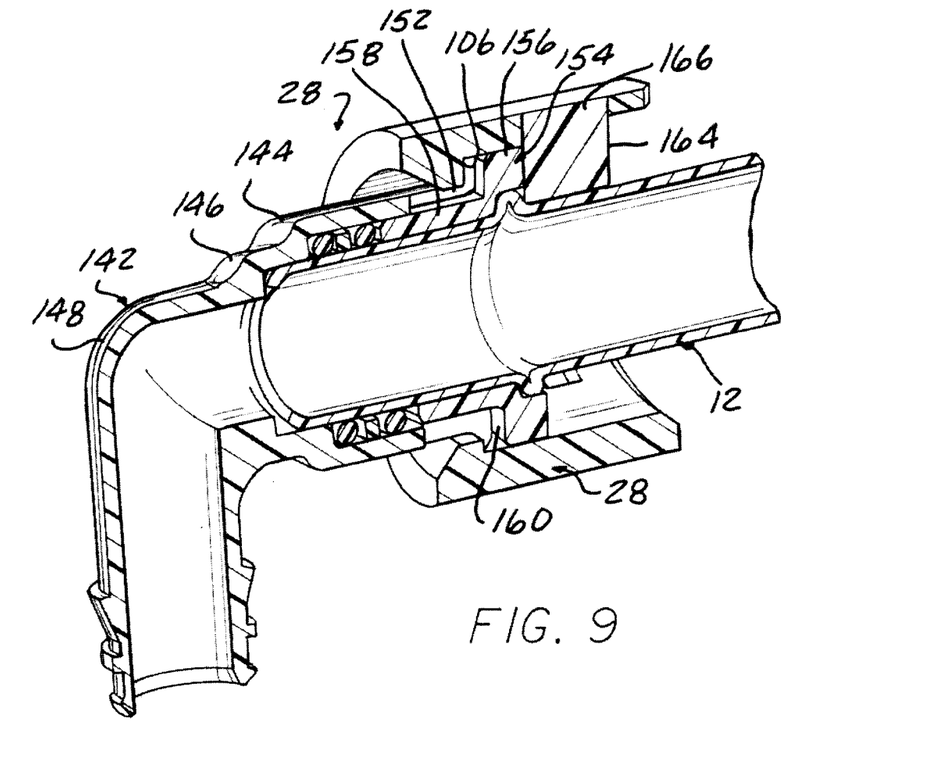
FIG. 9 is a longitudinal, cross-sectional, perspective view of the assembled quick connector shown in FIG. 7.

It should also be noted in FIGS. 9 and 10 that an end portion of the flange 156 of the top hat 154 is provided with an annular recess 164. The outer diameter and the depth of the recess 164 are sized to receive the annular flange 22 on the first conduit 12 at a fully inserted position of the first conduit 12 in the joined first and second housings 142 and 28 as shown in FIGS. 7 and 9.

The retainer 166 is similar to the retainer shown in U.S. Pat. No. 5,730,481 in that it includes a pair of legs 168 and 170 which depend from a central bight portion 172. Inwardly extending projections 174 and 176 have free ends movably spaced from the adjacent legs 168 and 170 and are dimensioned to slidingly engage and fit around the cylindrical portion of the first conduit 12 only when the first conduit 12 is fully inserted into the second housing 28. Outwardly extending projections 178 and 180 are formed on the lower portion of each leg 168 and 170 and are devised for engaging an edge of the grooves 65 in the side legs 64 and 66 of the second housing 28 in a partially inserted, shipping position shown in greater detail in FIG. 10, or a lower edge of the side legs 64 and 66 in the fully inserted position thereby locking the first conduit 12 in the joined first and second housings 142 and 28.

Figures 8, 12:
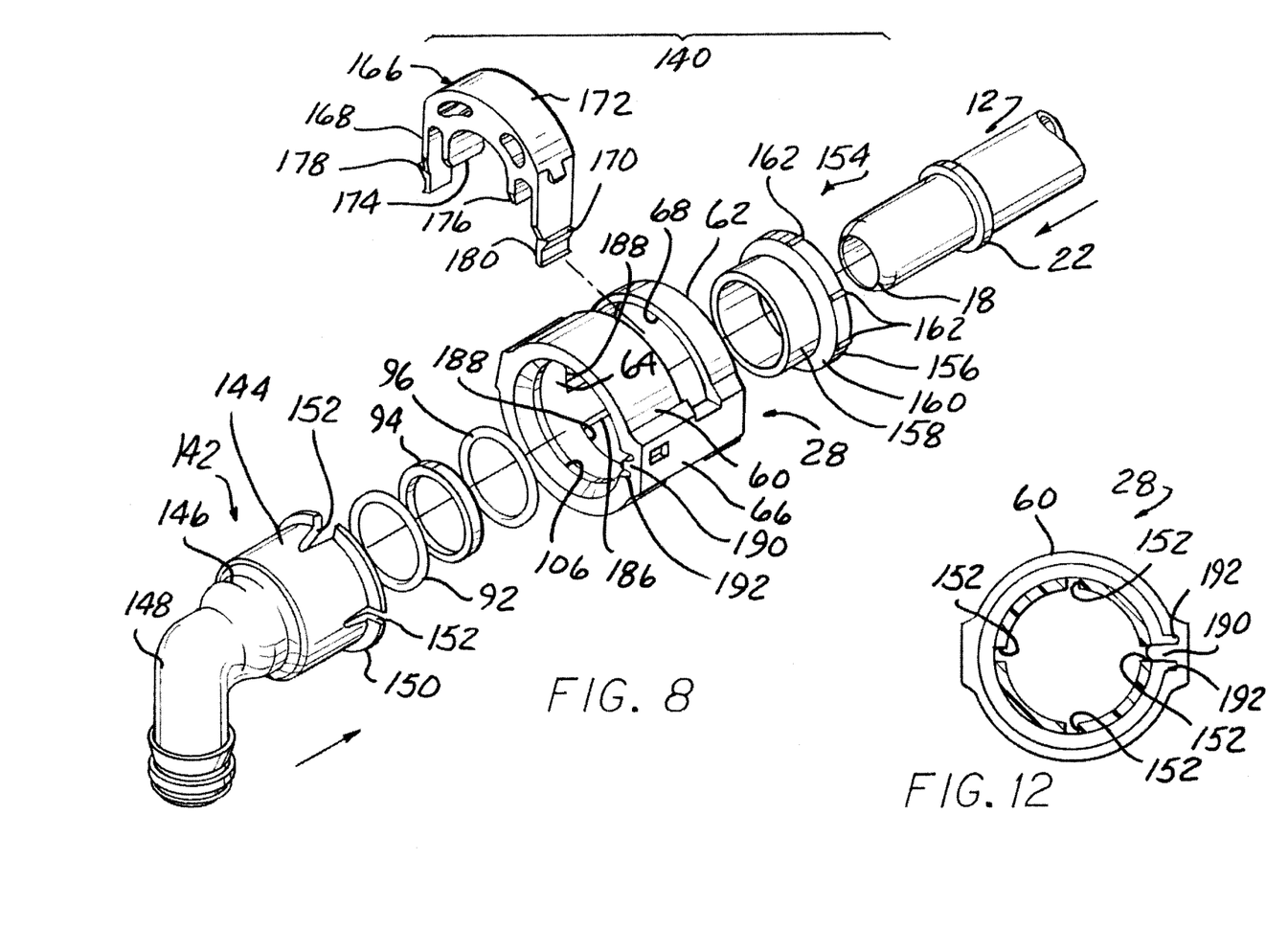
FIG. 8 is an exploded perspective view of the rotatable quick connector shown in FIG. 7.
FIG. 12 is a partially cross-sectioned, end view of the assembled quick connector of FIG. 7.

In this aspect of the invention, the retainer 166 does not have an undercut forming a surface which is adapted to engage the side surface of the enlarged flange 22 on the first conduit 12 when the first conduit 12 is fully inserted into the first and second housings 142 and 28. Rather, the interior portions of the retainer 166 are substantially flush with the side edges of the legs 168 and 170. However, it will be understood that the projections 174 and 176 will still resist full insertion of the retainer 166 into the second housing 28 if the first conduit 12 is not fully inserted into the first housing 142 since the enlarged flange 22 will be in an interference position with the projections 174 and 176.

Further, the use of the recess 164 in the top hat 154 is applicable to other quick connectors, such as those in the previously listed patents, wherein the connector includes only one non-rotatable housing.

Figure 11:
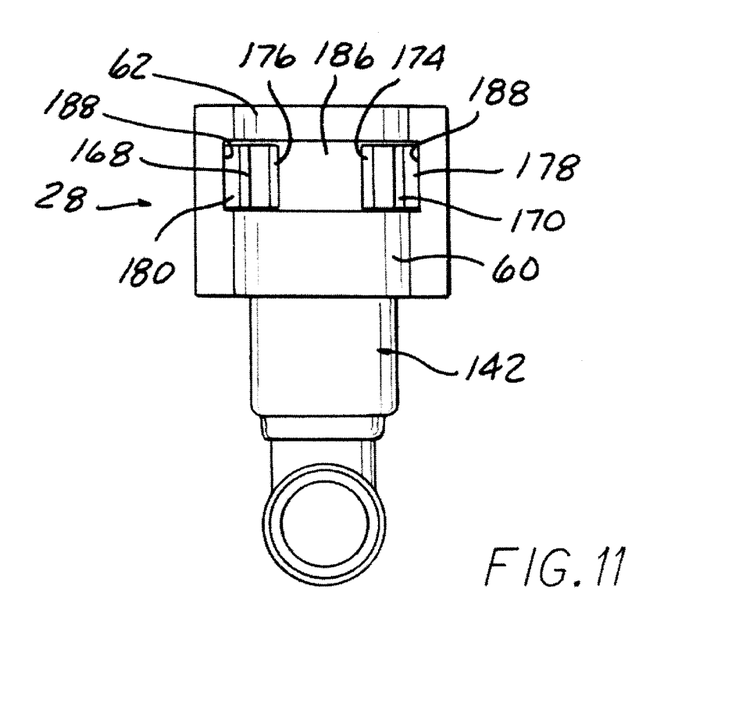
FIG. 11 is a bottom view of the assembled quick connector of FIG. 7.

Several unique aspects of the connector 140 will now be described. As shown in FIGS. 8 and 11, a web or flange 186 is formed in the first housing 26 between the first and second ring members 60 and 62. The flange 186 is preferably disposed in the transverse opening 70. The flange 186 divides the transverse opening 70 into two small slot-like apertures denoted by reference number 188. Each aperture 188 receives the lower end portion of the side legs 168 and 170 of the retainer 166, but will prevent a large amount of radially inward flexing of the lower end portions of the side legs 168 and 170 during removal of the retainer 166 from the second housing 28 which could cause breakage of the legs 168 and 170.

The web 186 can also be employed in other connectors, such as those describe in the above-listed patents.

FIG. 10 also shows the longitudinally extending interior grooves 65 formed in each of the side legs 64 and 66 of the second housing 28. The grooves 65 receive the projections 178 and 180 on the side legs 166 and 170 of the retainer 166 in a snap-in connection to hold the retainer 166 in the partially inserted shipping position shown in FIG. 10.

The retainer 166 will remain in this shipping position that the retainer 166 will remain in during insertion of the first conduit 12 into the joined first and second housings 142 and 28. Only after the first conduit 12 has been fully inserted into the first housing 142 will the retainer 166 be able to be fully inserted through the transverse aperture 70 in the second housing 28 as described above.

Finally, as shown in FIGS. 7 and 12, the connector 140 is provided with a unique indexing feature in which a radially inward extending projection 190 is formed adjacent one end of the second housing 28. The projection 190 has undercut side edges 192 which allow flexure of the projection 190.

The projection 190 is positioned to engage any of the slots 152 in the first housing 142 when the first housing 142 is rotatably mounted in the second housing 28 as described above. In this manner, one of the first housing 142 and the second housing 28 is rotatable relative to the other until the projection 190 engages one of the slots 152. Continued rotation of either the first housing 142 or the second housing 28 will cause the projection 190 to flex radially outward thereby disengaging from one of the slots 152 and allowing the projection 192 to slide along the exterior surface of the first end portion 144 of the first housing 142 until the projection 190 reaches and snaps into the next circumferentially adjacent slot 152. This provides a tactile feel to the installer to fix the relative angular positions of the first and second housings 142 and 28.

The slots 152 and the projection 190 could be reversed on the first and second housings 142 and 28 with the same effect.

In summary, there has been disclosed a unique rotatable quick connector having two rotatably interconnected, non-axially displaceable housings, one of which receives a retainer for lockingly connecting a first conduit in the joined housing portions for fluid communication with a sealed conduit sealingly mounted to the other housing portion. This arrangement enables the housing which receives the retainer to be rotated to a more convenient position for insertion or removal of the retainer from the housing. The rotatable aspects of the present invention may be applied to a number of different quick connector configurations.

The present invention, in different aspects, has a plurality of ribs or projections formed on the tip end of one housing which are forcibly engagable with the inner surface of the flexible conduit mounted thereover to prevent rotation between the tube and the housing.

In yet another aspect of the present invention, a cap having a smoothly curved or conical shaped outer end surface is fixedly mountable over the tip end of the female housing by means of an interlocking flange and recess formed on the tip end of the female housing and within the interior bore in the cap. The cap facilitates the easy sliding interconnecting of the tip end of the female housing and a flexible tube or conduit.

In another aspect, a web is formed in one of the transverse apertures in one housing to divide the aperture into two smaller apertures, each receiving one end portion of one side leg of the retainer. The web limits the amount of radially inward movement of the ends of the side legs of the retainer during removal forces exerted on the side legs to release the retainer from the female housing. This prevents potential damage to the retainer; and, at the same time, does not interfere with the movement of the retainer between the normal insertion and storage positions in the housing.

Finally, in yet another aspect of the present invention, a top hat is mounted along with at least one seal element in the stepped bore in one housing. The top hat includes an end recess which receives the enlarged flange on the male conduit. In this manner, the retainer can be formed with flat side surfaces to engage the flange on the male conduit to prevent axial separation of the male conduit from the female housing.

What is claimed is:

1. A quick connector for joining first and second conduits in fluid flow communication, the first conduit having an enlarged flange spaced from a first end, the quick connector comprising:
   a first housing having a through bore with a first bore portion adapted for receiving a first end of a first conduit;
   a second housing rotatably and non-axially displaceably connected to the first housing, the second housing having a through bore axially alignable with the first bore portion of the first housing for receiving the first conduit therethrough, a second conduit adapted to be mounted on the first housing;
   a retainer mountable in the second housing for lockingly coupling the first conduit to the first housing; and
   mounting means cooperatively carried on the first and second housings for rotatably interconnecting the first and second housings, the mounting means including:
   a raised annular flange formed on the first housing;
   an annular shoulder at one end of the second housing;
   the flange rotatably disposed with respect to the shoulder of the second housing, with the first housing axially extending through the one end of the second housing; and
   a top hat mountable in the first housing and spaced from the flange on the second housing to form an annular recess to rotatably maintain the first and second housings in a coupled rotatable arrangement.

2. The quick connector of claim 1 further comprising:
   means for fixing the top hat to the second housing.

3. The quick connector of claim 2 wherein the fixing means comprises:
   at least one aperture formed in the second housing proximate the one end of the second housing; and
   the top hat having at least one leg, a projection carried on the at least one leg latchingly engagable with the aperture in the second housing.

4. The quick connector of claim 2 wherein the fixing means comprises:
   the top hat press fit in a fixed position within the first housing.

5. The quick connector of claim 1 further comprising:
   the second housing having an opposed end to the one end; and
   the first housing insertable through the second housing from the opposed end to the one end.

6. The quick connector of claim 1 further comprising:
   the first housing insertable into the second housing through the one end.

7. The quick connector of claim 6 further comprising:
   a plurality of slots formed in the flange on the one end of the first housing, the slots allowing the one end of the first housing to bend radially inward during insertion through the one end of the second housing until the flange on the one end of the first housing clears the shoulder in the one end of the second housing.

8. A quick connector for joining first and second conduits in fluid flow communication, the first conduit having an enlarged flange spaced from a first end, the quick connector further comprising:
   a first housing having a though bore with a first bore portion adapted for receiving a first end of a first conduit;
   a second housing rotatably and non-axially displaceably connected to the first housing, the second housing having a through bore axially alignable with the first bore portion of the first housing for receiving the first conduit therethrough, a second conduit adapted to be mounted on the first housing;
   a retainer mountable in the second housing for lockingly coupling the first conduit to the first housing; and
   indexing means cooperatingly arranged between the first and second housings for incremental non-movable locked rotational positioning of the first and second housings with respect to each other.

9. The quick connector of claim 8 wherein the indexing means comprises:
   at least one radially extending projection formed on one of the first and second housings; and
   at least one aperture formed on the other of the first and second housings engagable with a projection.

10. The quick connector of claim 9 wherein:
    the at least one aperture is formed as a plurality of apertures.

11. The quick connector of claim 1 further comprising:

the second housing including a second bore formed by a pair of opposed apertures formed transversely to and intersecting the through bore in the second housing, the retainer mountable through the second bore;

the retainer having opposed legs extending from a central end portion;

projections on the legs engagable with edges of the second housing adjacent the opposed apertures to lockingly mount the retainer in the second housing; and a web extending axially through only one of the opposed apertures, the web dividing the aperture into a pair of smaller apertures, each receiving an end portion of one leg of the retainer, the web limiting inward flexing of the legs of the retainer upon removal of the retainer from the second housing.

12. The quick connector of claim 1 further comprising:

the second housing including a second bore transverse to and intersecting the through bore;

a seal member mounted in the first axial bore;

a top hat mounted in the axial bore adjacent to the seal member;

an annular recess extending inward from one end of the top hat opening to the second bore in the second housing when the top hat is mounted in the second housing, the annular recess adapted to receiving the flange on the first conduit; and the retainer having a side edge disposable in the second bore adjacent to the flange on the first conduit to restrain axial disengagement of the first conduit from the first housing.

13. A quick connector for joining first and second conduits in fluid flow communication, the first conduit having an enlarged flange spaced from a first end, the quick connector comprising:

a first housing having a through bore with a first bore portion adapted for receiving a first end of a first conduit;

a second housing rotatably and non-axially displaceably connected to the first housing, the second housing having a through bore axially alignable with the first bore portion of the first housing for receiving the first conduit therethrough, a second conduit adapted to be mounted on the first housing;

a retainer mountable in the second housing for lockingly coupling the first conduit to the first housing; and a cap mountable over a second end of the first housing, for smoothly guiding the interior surface of the second conduit over the second end of the first housing during coupling of the second conduit to the first housing;

a seal mounted on the second end of the first housing between the second end of the cap and a radial enlargement spaced from the second end of the first housing for sealingly engaging an inner surface of the second conduit when the second conduit is mounted over the second end of the first housing; and snap connection means for fixedly mounting the cap on the second end of the first housing such that the cap guides the second conduit over the seal.

14. The quick connector of claim 13 wherein the snap connection means comprises:

a second end of the first housing having one of a radially outward extending projection and a recess;

a conical cap having smooth exterior surface and a through bore; and one of a recess and a projection formed in the interior of the cap snap engagable with one of the recess and the projection on the first housing to secure the cap to the first housing.

15. The quick connector of claim 14 further comprising:

the through bore in the cap having a diameter at least as large as the diameter of the bore extending through the second end of the first housing.

16. The quick connector of claim 15 wherein the through bore in the cap comprises:

a first bore portion extending from a first end of the cap; and a second bore portion extending from the second end of the cap, the second bore portion having a larger diameter than the diameter of the first bore portion.

17. The quick connector of claim 16 further comprising:

a shoulder formed at a juncture of the first and second bores in the cap, the shoulder engagable with the second end of the first housing for limiting the mounting distance of the cap over the second end of the first housing.

18. A quick connector comprising:

a male component having an external flange proximate to a first end;

a female component including a housing having a first axial bore extending between opposed first and second ends to receive the first end of the male component;

a transverse bore formed in the housing intersecting the first axial bore;

a retainer received within the transverse bore of the housing, the retainer having a pair of side legs separated by an end wall, a first surface on each side leg axially opposing the flange on the male component to prevent axial disengagement of the male component from the first bore in the female component;

a seal member disposed in the first axial bore;

a top hat disposed in the axial bore adjacent to the seal member; and an annular recess extending inward from one end of the top hat opening to the second bore in the female component when the top hat is mounted in the female component, the annular recess receiving the flange on the male component when the male component is fully inserted into the female component.

19. The quick connector of claim 18 wherein:

the axial length of the annular recess in the top hat is substantially equal to the axial length of the enlarged flange on the first conduit to substantially accommodate all of the enlarged flange on the first conduit in the annular recess in the top hat.

20. The quick connector of claim 18 further comprising:

projections on the side legs of the retainer engagable with edges of the male component adjacent the transverse bore to lockingly mount the retainer in the male component; and a web extending axially through one of the opposed apertures, the web dividing the aperture into a pair of smaller apertures, each receiving an end portion of one leg of the retainer, the web limiting the amount of inward flexing of the legs of the retainer upon separation of the retainer from the housing of the female.

21. The quick connector of claim 18 further comprising:

a plurality of axial, non-annular, radially outward extending ribs formed on the first end of the housing, the ribs engagable with an inner surface of a flexible conduit forced over the first end of the housing to prevent rotation between the flexible conduit and the first end of the housing.

22. A quick connector comprising:

a male component having an external flange proximate to a first end;

a female component including a housing having a first axial bore extending between opposed first and second ends to receive the first end of the male component;

a transverse bore formed in the housing intersecting the first axial bore;

a retainer received within the transverse bore of the housing, the retainer having a pair of side legs separated by an end wall, a first surface on each side leg axially opposing the flange on the male component to prevent axial disengagement of the male component from the first bore in the female component;

a seal member disposed in the first axial bore;

a top hat disposed in the axial bore adjacent to the seal member;

an annular recess extending inward from one end of the top hat opening to the second bore in the female component when the top hat is mounted in the female component, the annular recess receiving the flange on the male component when the male component is fully inserted into the female component;

one end of the female component having a radially outward extending projection;

a conical cap having a smooth exterior surface and a through bore; and a recess formed in the interior of the cap snap engagable with the projection on the female component to secure the cap to the female component.

23. The quick connector of claim 22 further comprising:

one end of the first housing having a radially outward extending flange;

a conical cap having a smooth exterior surface and a through bore;

an annular recess formed on one of the interior of the conical cap and the one end of the female component; and one of a radially outward extending projection and a radially inward extending recess is formed on the one end of the female component.

24. A quick connector comprising:

a male component having an external flange proximate to a first end;

a female component including a housing having a first axial bore extending between opposed first and second ends to receive the first end of the male component;

a retainer mountable in the first axial bore of the housing to prevent axial displacement of the male component from first axial bore in the housing;

one end of the housing having a radially outward extending projection;

a conical cap having a smooth exterior surface and a through bore, the cap guiding a conduit over the second end of the female component; and a recess formed in the interior of the cap snap engagable with the projection on the housing to secure the cap to the female component.

* * * * *